(12) United States Patent
Sato

(10) Patent No.: US 8,096,187 B2
(45) Date of Patent: Jan. 17, 2012

(54) PRESSURE SENSOR ELEMENT AND PRESSURE SENSOR

(75) Inventor: Kenta Sato, Chigasaki (JP)

(73) Assignee: Seiko Epson Corporation, Tokyo (JP)

(*) Notice: Subject to any disclaimer, the term of this patent is extended or adjusted under 35 U.S.C. 154(b) by 158 days.

(21) Appl. No.: 12/707,234

(22) Filed: Feb. 17, 2010

(65) Prior Publication Data

US 2010/0212435 A1 Aug. 26, 2010

(30) Foreign Application Priority Data

Feb. 26, 2009 (JP) ................. 2009-044221

(51) Int. Cl.
*G01L 9/08* (2006.01)
(52) U.S. Cl. .................. 73/717; 73/716; 73/723
(58) Field of Classification Search .......... None
See application file for complete search history.

(56) References Cited

U.S. PATENT DOCUMENTS

| | | | | |
|---|---|---|---|---|
| 7,409,865 B2* | 8/2008 | Greenwood | ........... | 73/715 |
| 7,942,062 B2* | 5/2011 | Motoyama | ........... | 73/717 |
| 2007/0113662 A1* | 5/2007 | Greenwood | ........... | 73/716 |
| 2010/0018318 A1* | 1/2010 | Watanabe et al. | ........... | 73/715 |
| 2010/0039415 A1 | 2/2010 | Ibaraki et al. | | |

FOREIGN PATENT DOCUMENTS

| | | |
|---|---|---|
| JP | U-1-102736 | 7/1989 |
| JP | A-2007-327922 | 12/2007 |
| JP | A-2007-333452 | 12/2007 |
| JP | A-2008-514902 | 5/2008 |
| JP | A-2008-241287 | 10/2008 |
| JP | A-2008-267896 | 11/2008 |
| WO | WO 2006/034538 A1 | 4/2006 |

* cited by examiner

*Primary Examiner* — Andre Allen
(74) *Attorney, Agent, or Firm* — Oliff & Berridge, PLC

(57) ABSTRACT

A pressure sensor element includes: a package, a first diaphragm provided on a first surface of the package, a second diaphragm provided on a second surface of the package, and a pressure sensing element disposed in the package, the pressure sensing element including: a first base formed at one end in a longitudinal direction of the pressure sensing element, a second base formed at the other end in the longitudinal direction, and a resonating portion formed between the first base and the second base. In the element, the first and second surfaces are opposed to each other. The pressure sensor element is disposed such that the longitudinal direction is orthogonal to a displacement direction of each of the first and second diaphragms. The first base is connected to the first diaphragm while the second base is connected to the second diaphragm.

9 Claims, 14 Drawing Sheets

FIG. 3A
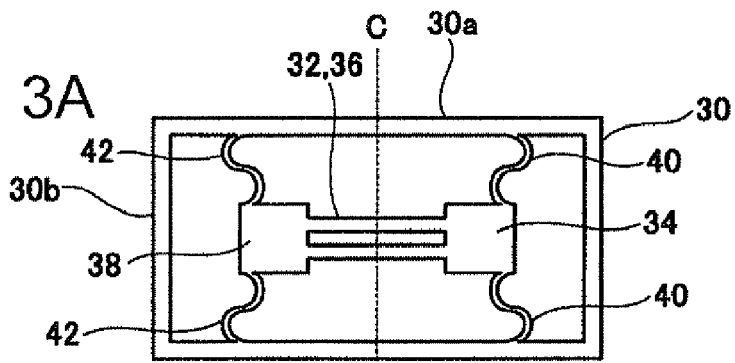
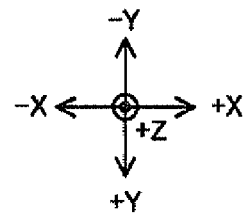
FIG. 3B
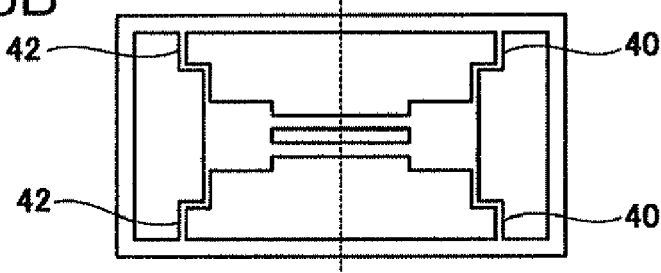
FIG. 3C
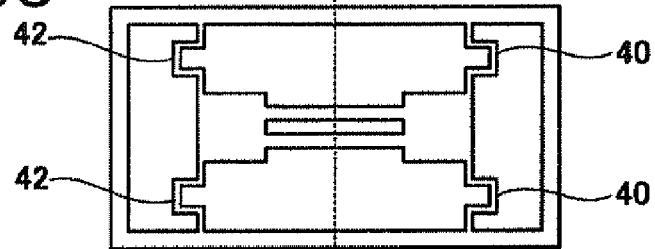
FIG. 3D
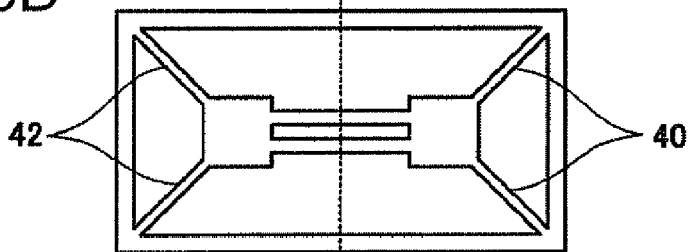

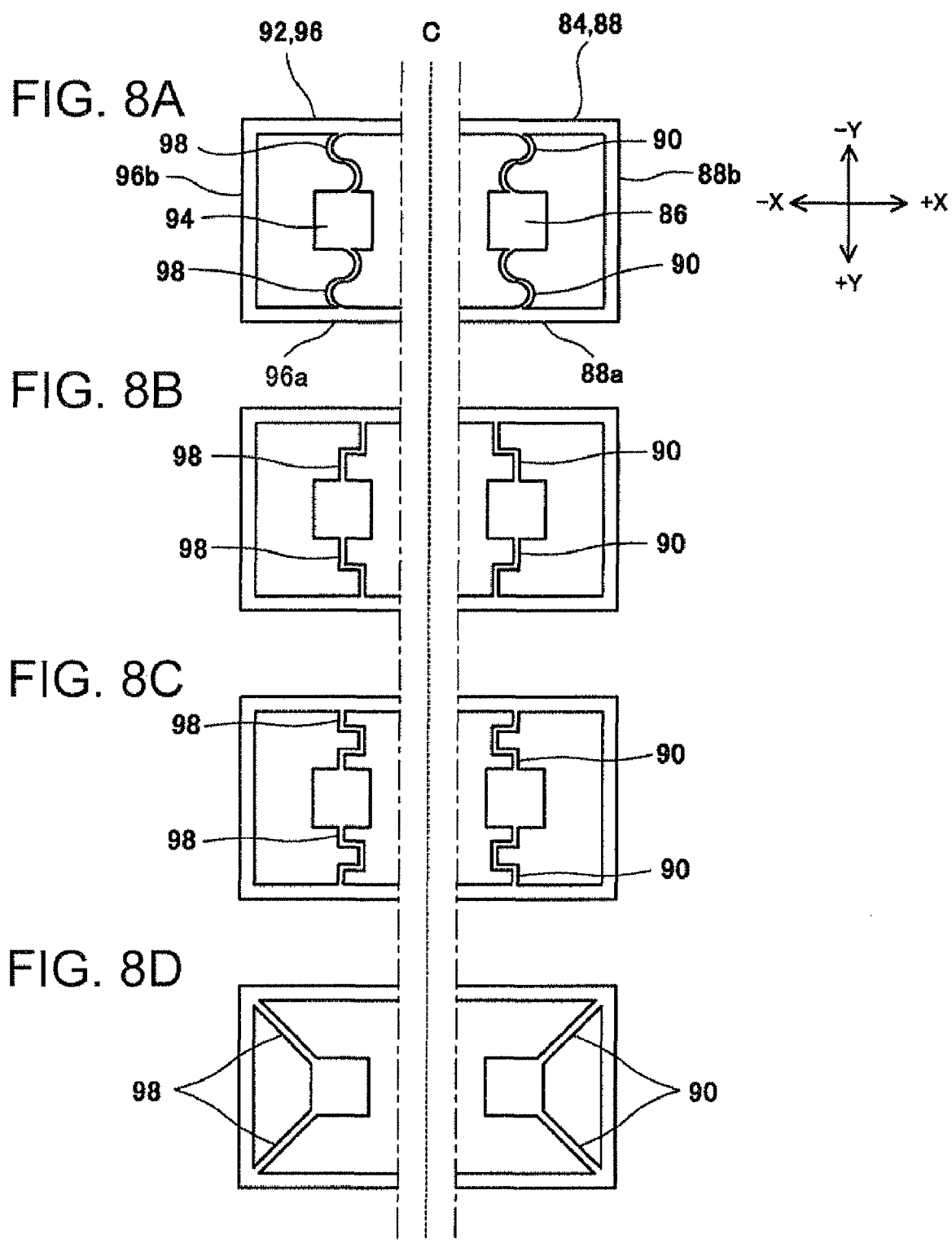

PRESSURE SENSOR ELEMENT AND PRESSURE SENSOR

BACKGROUND

1. Technical Field

The present invention relates to a pressure sensor element using a pressure sensing element and a diaphragm, and a pressure sensor. In particular, the present invention relates to a technique for reducing errors in a pressure measurement value accompanied by acceleration change.

2. Related Art

Pressure sensors that include a piezoelectric resonator element as a pressure sensing element have been known as water pressure gauges, air gauges, differential pressure gauges, or the like. The piezoelectric resonator element includes, for example, a planar piezoelectric substrate on which an electrode pattern is formed, and a detection axis set in a direction in which force is detected. When pressure is applied in the direction of the detection axis, a resonance frequency of the piezoelectric resonator changes and the pressure is detected from the change of the resonance frequency.

Related art techniques for enhancing accuracy of the pressure sensor are disclosed. JP-A-2007-333452 is a first example of related art. FIG. 13 shows a pressure sensor element disclosed in the first example. As shown in FIG. 13, a pressure sensor element 220 is placed on a pair of supports 218 formed in a diaphragm 212 in a pressure sensor 210. The pressure sensor element 220 includes two bases 222 respectively fixed to the pair of supports 218, and a resonating portion 224 between the bases. Cutouts 222a and 222b are provided between a portion of each base 222 fixed to the support 218 and the resonating portion 224. Accordingly, bending deformation of the resonating portion 224 by the diaphragm 212, i.e., displacement in a thickness direction is concentrated where the cutouts 222a and 222b are formed. Thus, nonlinear force acting on the resonating portion 224 is suppressed, reducing adverse effects on the resonating portion 224 of the pressure sensor element 220.

JP-A-2007-327922 is a second example of related art. FIGS. 14A and 14B show a pressure sensor element disclosed in the second example. FIG. 14A is a schematic diagram when viewed from the front while FIG. 14B is a sectional view taken along the line A-A of FIG. 14A. As shown in FIGS. 14A and 14B, a pressure sensor element 320 is equipped with a piezoelectric resonator element 330 and serves as a pressure sensing element. The pressure sensor element 320 includes a pair of supports 324 for fixing the piezoelectric resonator 330 on a surface of a thin portion 322 serving as a flexible portion, and a projecting portion 326 between the pair of supports 324. The projecting portion 326 is provided so as to increase a thickness of the pressure sensor element 320. Accordingly, deformation of the projecting portion 326 formed between the supports 324 is suppressed, and therefore the projection portion 326 is prevented from being deformed in an arc. Thus, the projecting portion 326 between the supports 324 does not make contact with a resonating portion of the piezoelectric resonator element 330 by the deformation of the projecting portion 326 by a pressure load. Consequently, it is possible to suppress deterioration of detection accuracy of the frequency variation, i.e., deterioration of pressure detection accuracy due to the contact.

JP-A-2008-241287 is a third example of related art. FIG. 15 shows a pressure sensor element disclosed in the third example. As shown in FIG. 15, the pressure sensor element includes a piezoelectric resonator element 431, pedestals 444 and 445, and a thin plate-like diaphragm 440 to which a periphery 442 is fixed. The piezoelectric resonator element 431 includes bases 436 and 437 at both ends of resonating arms 434 and 435. The pedestals 444 and 445 are respectively bonded to the bases 436 and 437. The outline of the diaphragm 440 is formed in substantially rectangular or substantially square. The pedestals 444 and 445 are disposed at the both ends of the resonating arms across a center portion 440b of the diaphragm 440. The pedestals 444 and 445 are formed such that a width direction thereof in a direction orthogonal to the center portion 440b is decreased as they extend toward the center portion 440b. This allows the diaphragm 440 to easily bend as it extends toward the center portion 440b. Thus, displacement of the diaphragm 440 becomes large as it extends toward the center portion 440b when pressure is applied. Since the piezoelectric resonator element 431 easily bends in which the bases 436 and 437 are respectively bonded to the pedestals 444 and 445 at the both ends of the resonating arms across the center portion 440b, it is possible to realize a pressure sensor element capable of measuring pressure with high sensitivity.

These pressure sensors have a structure such that displacement of the diaphragm is transmitted to a pressure sensing element, such as a double-ended tuning fork element. Thus, higher sensitivity can be obtained as the displacement with respect to pressure to be measured is larger. In recent years, it has been proposed that the pressure sensor having enhanced accuracy is utilized for tire pressure monitoring systems (TPMS) for vehicles or height difference detecting devices for car navigation systems.

However, acceleration is generated at an instant at which a vehicle runs onto a step when the vehicle is moving, especially running at high speed on a highway. Then, in addition to a bend of the diaphragm of the pressure sensor due to pressure to be measured, a bend due to the acceleration is further added. This causes variations of an unnecessary bend due to the acceleration in resonance frequency of the pressure sensing element. As a result, errors are caused in a pressure detection value detected by a pressure sensor.

SUMMARY

An advantage of the invention is to provide a highly sensitive pressure sensor that is capable of preventing errors in a pressure detection value due to acceleration generated in the pressure sensor.

The present invention intends to solve at least part of the problems described above, and can be realized as the following aspects.

According to a first aspect of the invention, a pressure sensor element includes: a package, a first diaphragm provided on a first surface of the package, a second diaphragm provided on a second surface of the package, and a pressure sensing element disposed in the package, the pressure sensing element including: a first base formed at one end in a longitudinal direction of the pressure sensing element, a second base formed at the other end in the longitudinal direction, and a resonating portion formed between the first base and the second base. In the element, the first and second surfaces are opposed to each other. The pressure sensor element is disposed such that the longitudinal direction is orthogonal to a displacement direction of each of the first and second diaphragms. The first base is connected to the first diaphragm while the second base is connected to the second diaphragm.

According to the structure, the pressure sensing element receives displacement from the first and second diaphragms as force, so that the pressure sensor element can measure absolute pressure. When the first and second diaphragms receive external pressure, the first and second diaphragms are displaced toward each other. Thus, the pressure sensing element is displaced in a direction in which the first and second bases are displaced away from each other, and receives extensional stress. Accordingly, pressure can be detected.

Meanwhile, when the pressure sensor element receives acceleration, the first and second diaphragms are displaced in the same direction, and the first and second bases are displaced in the substantially same direction. Since substantially no stress is applied to the pressure sensing element at this time, it is possible to reduce errors in a pressure measurement value due to acceleration.

According to a second aspect of the invention, a pressure sensor element includes a pressure sensing element layer, a first layer displaced by receiving force, and a second layer displaced by receiving the force. The pressure sensor element includes a resonating portion detecting displacement, a first base formed at one end in a longitudinal direction of the resonating portion, a second base formed at the other end in the longitudinal direction, a pressure sensing element frame surrounding the resonating portion, the first base, and the second base, a first connecting portion connecting the pressure sensing element frame and the first base, and a second connecting portion connecting the pressure sensing element frame and the second base. The first layer includes a first periphery formed on a surface opposed to the pressure sensing element layer, a first recess that is formed inside the first periphery and displaced by receiving the force, and a first projection formed in the first recess so as to oppose to the first base. The second layer includes a second periphery formed on a surface opposed to the pressure sensing element layer, a second recess that is formed inside the second periphery and displaced by receiving the force, and a second projection formed in the second recess so as to oppose to the second base. In the element, the pressure sensing layer is formed between the first and second layers and detects the displacement. The first periphery, the pressure sensing element frame, and the second periphery are sequentially stacked. The first base is connected to the first projection while the second base is connected to the second projection. According to the structure, the pressure sensor element according to the first aspect can be mass produced by stacking members having a simple structure.

The first and second connecting portions may include a member extending in a direction orthogonal to the longitudinal direction. Accordingly, the first and second bases can easily move by the first and second connecting portions, being able to improve sensitivity of the pressure sensor element.

The first layer may be a stack structure of a first diaphragm layer and a first support layer while the second layer may be a stack structure of a second support layer and a second diaphragm layer. The first support layer may include a first support, a first support frame surrounding the first support, a first beam extending from the first support frame and being connected to the first support. The first support may be connected to the first diaphragm layer so as to form the first projection while the first support frame may be connected to the first diaphragm layer so to form the first periphery and the first recess. The second layer may include a second support, a second support frame surrounding the second support, and a second beam extending from the second support frame and being connected to the second support. The second support may be connected to the second diaphragm layer so as to form the second projection while the second support frame may be connected to the second diaphragm layer so as to form the second periphery and the second recess.

According to the structure, though the stack structure is more complex than that of the structures described above, the first and second diaphragm layers are formed without photolithography-etching, sandblasting, or the like. As a result, it is possible to avoid formation of etching pipes by photolithography-etching as well as cracks by sandblasting in each diaphragm layer.

The first and second beams may include a member extending in a direction orthogonal to the longitudinal direction. Accordingly, the first and second bases can easily move by the first and second beams, being able to improve sensitivity of the pressure sensor element.

According to a third aspect of the invention, a pressure sensor includes the pressure sensor element according the first aspect, a substrate on which the pressure sensor element is mounted, a bump provided on the substrate at a position at which the pressure sensor element makes contact with the substrate so as to form a space between the pressure sensor element and the substrate, and a driving circuit electrically connected to the pressure sensor element.

Since the space is formed between the pressure sensor element and the substrate, a pressure sensor is provided that prevents degradation of the response of the diaphragm opposed to the substrate to pressure, and the diaphragms can easily displaced toward the substrate by pressure.

According to a fourth aspect of the invention, a pressure sensor includes the pressure sensor element according to the first aspect, a substrate on which the pressure sensor element is mounted, and a driving circuit electrically connected to the pressure sensor element so as to drive the pressure sensor element. In the sensor, one of side surfaces of the pressure sensor element is bonded to the substrate.

Accordingly, the first and second diaphragm layers are not interfered by the substrate during pressure measurement. Thus, it is possible to realize a pressure sensor that reduces errors in a pressure measurement value by acceleration while being reduced in height.

The driving circuit may be electrically connected to the pressure sensor element by wire bonding. This allows more freedom in arrangement of the driving circuit and the pressure sensor element on the substrate.

The driving circuit may be electrically connected to the pressure sensor element through a bump. In this way, it is possible to reduce an area and volume of the substrate required for mounting the sensor element, being able to realize a downsized pressure sensor.

BRIEF DESCRIPTION OF THE DRAWINGS

The invention will be described with reference to the accompanying drawings, wherein like numbers reference like elements.

FIGS. 3A through 3D are schematic diagrams showing first and second connecting portions in the first embodiment.

FIGS. 8A through 8D are schematic diagrams showing first and second beams in the second embodiment.

DESCRIPTION OF EXEMPLARY EMBODIMENTS

Embodiments of the present invention will be described in detail below with reference to the accompanying drawings. Note that elements, kinds, combinations, shapes, relative positions, and the like described in the embodiments do not limit the range of this invention, but are only examples unless the description gives a specific statement.

Figure 1A:
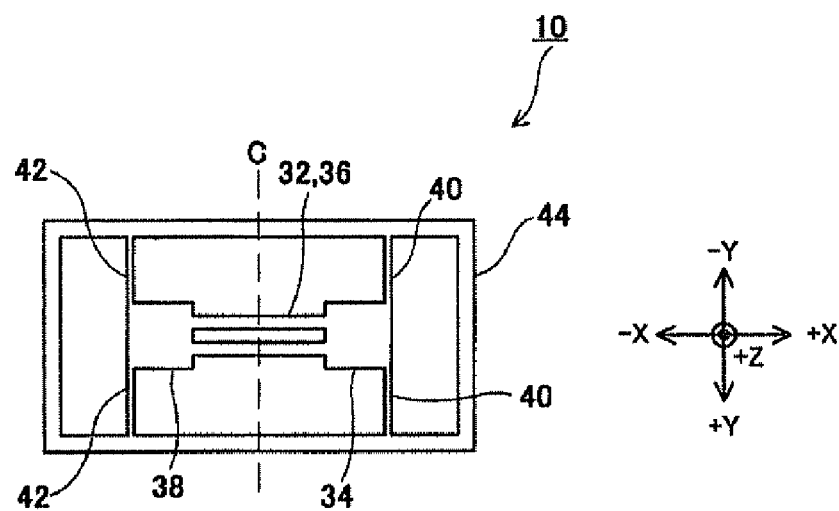
FIGS. 1A and 1B are schematic diagrams showing a pressure sensor element according to a first embodiment.
Figure 1B:
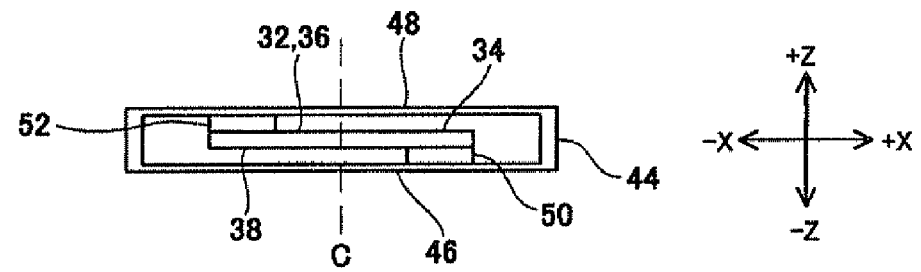

FIGS. 1A and 1B show a pressure sensor element according to a first embodiment. FIG. 1A is a schematic diagram when viewed from directly above (an XY-plane) while FIG. 1B is a schematic diagram when viewed from the front (an XZ-plane). A pressure sensor element 10 according to the first embodiment includes a package 44, a first diaphragm 46 provided on a surface of the package 44, a second diaphragm 48 provided on a surface of the package 44 which is opposed to the surface on which the first diaphragm 46 is provided, and a pressure sensing element 32 disposed in the package 44. The pressure sensing element 32 includes a first base 34 formed at one end in a longitudinal direction thereof, a second base 38 formed at the other end in the longitudinal direction, and a resonating portion 36 formed between the first base 34 and the second base 38. The pressure sensing element 32 is disposed such that the longitudinal direction is orthogonal to a displacement direction of each diaphragm. The first base 34 is connected to the first diaphragm 46 while the second base 38 is connected to the second diaphragm 48. The pressure sensor element 10 is used to measure absolute pressure in relation to vacuum. Here, an orthogonal coordinate system (an X-axis, a Y-axis, and a Z-axis) is used in FIGS. 1A and 1B as well as the drawings below.

The package 44 is a rectangular chassis whose long side is in a plus and minus X direction and short side is in a plus and minus Y direction. Each surface in a plus and minus Z direction serves as a pressure-receiving surface for receiving external pressure. The inside of the package 44 is sealed in vacuum so as to house the pressure sensing element 32 and the like described below. Accordingly, in the pressure sensor element 10, a Q value of the pressure sensing element 32 is enhanced and a stable resonance frequency can be maintained, thus being able to secure long term stability of the pressure sensor element 10. The package 44 is axisymmetric with respect to a center line C.

The first diaphragm 46 is formed on the surface in the −Z direction of the package 44 while the second diaphragm 48 is formed on the surface in the +Z direction of the package 44.

In addition to the package 44, the first diaphragm 46 and the second diaphragm 48 are axisymmetric with respect to the center line C. The first and second diaphragms 46 and 48 are a portion of the package 44 that are formed thinner than the rest. The diaphragms 46 and 48 are displaced toward the inside of the package 44 while being bent and deformed by external pressure. By the external pressure, the first diaphragm 46 is displaced in the +Z direction while the second diaphragm 48 is displaced in the −Z direction. Though the diaphragms are displaced in opposite directions from each other, they are parallel to each other. Here, the first and second diaphragms 46 and 48 have the same displacement to the same pressure.

A first support 50 is formed inside the package 44 on the first diaphragm 46 while a second support 52 is formed inside the package 44 on the second diaphragm 48. The first and second supports 50 and 52 have the same dimension, and are disposed such that a distance from the center line C to the first support (in the +X direction) is equal to a distance from the center line C to the second support (in the −X direction).

The pressure sensing element 32 is formed of a piezoelectric material such as quartz crystal, lithium niobate, or lithium tantalite, and is formed as an element such as a double-ended tuning fork type piezoelectric resonator, a single-beam type piezoelectric resonator, a surface acoustic wave (SAW) resonator, or a thickness shear resonator. The pressure sensing element 32 is axisymmetric with respect to the center line C, and is disposed such that the longitudinal direction thereof (the plus and minus X direction) is orthogonal to the displacement direction of the first and second diaphragms 46 and 48. The longitudinal direction serves as a detection axis. In the pressure sensing element 32, the first base 34 is fixed to the first support 50 while the second base 38 is fixed to the second support 52. The first and second bases 34 and 38 are at both ends in the longitudinal direction of the pressure sensing element 32 across the resonating portion 36. The pressure sensing element 32 is connected to the first diaphragm 46 through the first support 50 while being connected to the second diaphragm 48 through the second support 52. Consequently, when the first and second supports 50 and 52 are displaced toward each other, the resonating portion 36 receives compressive stress. On the other hand, when the first and second supports 50 and 52 are displaced away from each other, the resonating portion 36 receives extensional stress.

The pressure sensing element 32 is electrically connected to an oscillation circuit (not shown), and vibrates at its own characteristic resonant frequency in response to an alternating voltage supplied from the oscillation circuit. In particular, a resonance frequency of a double-ended tuning fork type piezoelectric resonator element used in the present embodiment changes substantially largely with respect to the extensional and compressive stress and therefore variable width of the resonance frequency is large, compared with resonators such as a thickness shear resonator. Thus, a double-ended tuning fork type piezoelectric resonator element is suitable for a pressure sensor having excellent resolution ability such as an ability of detecting a slight pressure differential. When the double-ended tuning fork type piezoelectric resonator receives extensional stress, amplitude of the resonating portion 36 is decreased, thereby increasing the resonance frequency. Meanwhile, when the resonator receives compressive stress, amplitude of the resonating portion 36 is increased, thereby decreasing the resonance frequency. It is preferable that a piezoelectric substrate of the double-ended tuning fork type piezoelectric resonator is formed of quartz crystal since it has excellent temperature characteristics.

Figure 2:
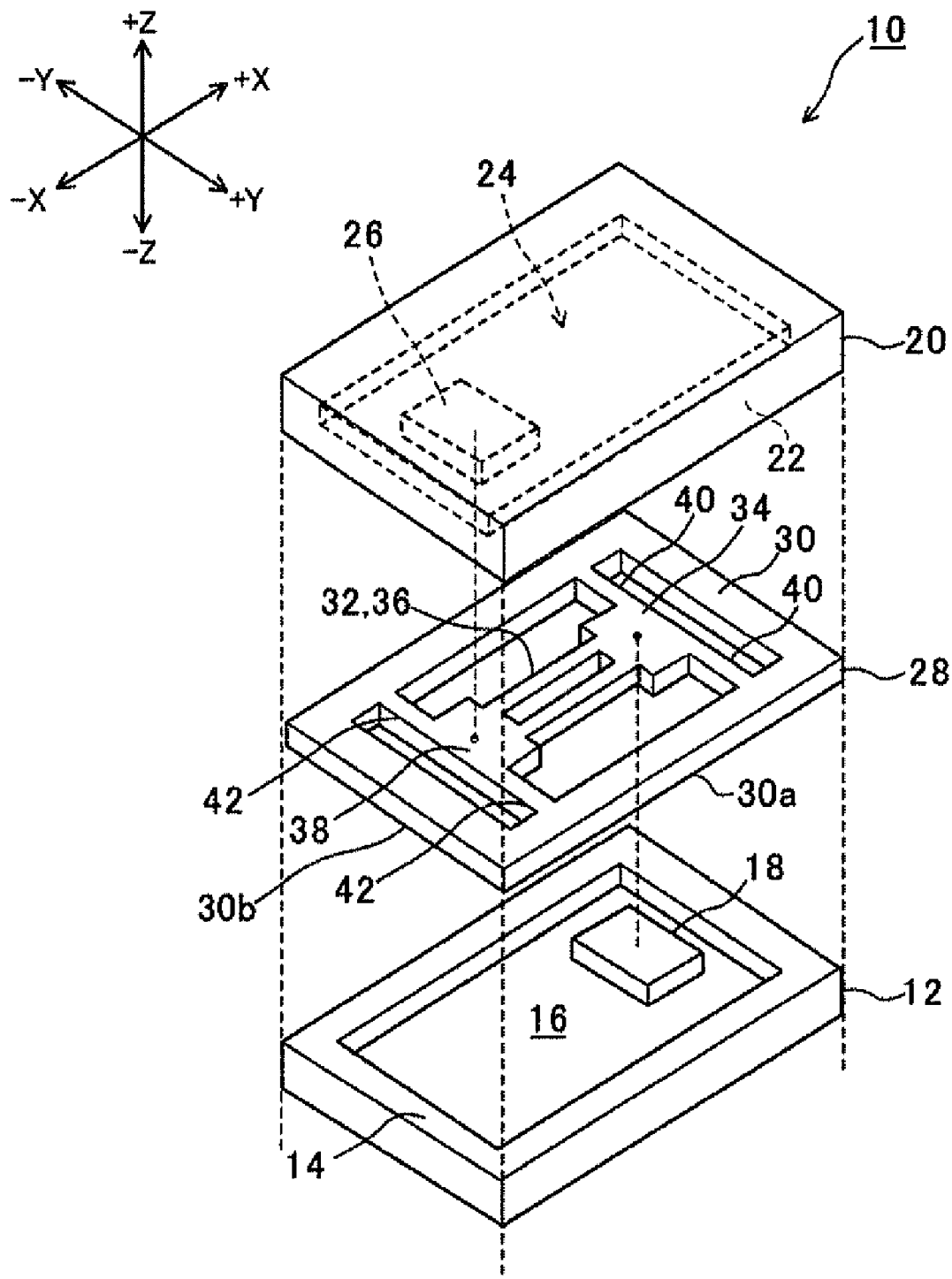
FIG. 2 is a diagram showing a stack structure of the pressure sensor element according to the first embodiment.

FIG. 2 shows a stack structure of the pressure sensor element according to the first embodiment. The pressure sensor element 10 having the above-described structure has a stack structure formed by stacking a first layer 12, a pressure sensing element layer 28, and a second layer 20. Each layer is formed of a piezoelectric material such as quartz crystal, and preferably formed of the same material. The first layer 12, the pressure sensing element layer 28, and the second layer 20 can be formed by photolithography-etching. Alternatively, the first and second layers 12 and 20 can be formed by sandblasting.

The first layer 12 is a rectangular plate having a predetermined thickness, and includes a first periphery 14, a first recess 16, and a first projection 18. Likewise, the second layer 20 is a rectangular plate having a predetermined thickness, and includes a second periphery 22, a second recess 24, and a second projection 26.

The pressure sensing element layer 28 includes a pressure sensing element frame 30, the pressure sensing element 32 (the first base 34, the resonating portion 36, and the second base 38), a first connecting portion 40, and a second connecting portion 42. Here, an inner periphery of the first periphery 14, the pressure sensing element frame 30, and the second periphery 22 are designed to be identical in dimension.

Thus, side surfaces of the package 44 are formed by stacking the first periphery 14, the pressure sensing element frame 30, and the second periphery 22 in this order. The first recess 16 serves as the surface of the package 44 in the −Z direction that includes the first diaphragm 46 while the second recess 24 serves as the surface of the package 44 in the +Z direction that includes the second diaphragm 48. The first projection 18 serves as the first support 50 by being connected to the first base 34 while the second projection 26 serves as the second support 52 by being connected to the second base 38.

The pressure sensing element layer 28 includes the first and second connecting portions 40 and 42 so that the pressure sensing element frame 30 holds the pressure sensing element 32. The first connecting portion 40 extends from the pressure sensing element frame 30 and is connected to the first base 34. The second connecting portion 42 extends from the pressure sensing element frame 30 and is connected to the second base 38.

A width of the first and second connecting portions 40 and 42 is narrower than that of the pressure sensing element 32 and the like. Further, the first and second connecting portions 40 and 42 include a member extending in a direction orthogonal to the longitudinal direction (the plus and minus X direction) of the pressure sensing element 32. Accordingly, when the first and second bases 34 and 38 are displaced in the longitudinal direction, the member orthogonal to the longitudinal direction can bend in the longitudinal direction at the first and second connecting portions 40 and 42. Thus, the first and second bases 34 and 38 can easily be displaced in the longitudinal direction. The first and second connecting portions 40 and 42 can take several forms as shown in FIGS. 3A through 3D and FIGS. 4A through 4D. As shown in FIG. 3A, the first and second connecting portions 40 and 42 having a wave shape extend inwardly from long lines 30a of the pressure sensing element frame 30, so that the first and second connecting portions have a spring property. This makes it possible to avoid stress concentration in the first and second connecting portions 40 and 42, being able to improve the breaking limit. As shown in FIGS. 3B and 3C, in a case where the first and second connecting portions 40 and 42 have an L-shape or a square C-shape, the member orthogonal to the longitudinal direction of the first and second connecting portions 40 and 42 can bend in the longitudinal direction at a position being bent at a right angle. As shown in FIG. 2, the first and second connecting portions 40 and 42 may have a bar-like shape extending in the direction (the plus and minus Y direction) orthogonal to the longitudinal direction of the pressure sensing element 32 (the plus and minus X direction).

As shown in FIG. 3D, the first and second connecting portions 40 and 42 can extend in a diagonal direction from corners inside of the pressure sensing element frame 30 and be connected to the first and second bases 34 and 38, respectively. In addition, the first and second connecting portions 40 and 42 may have a wave shape as shown in FIG. 3A in this state. Such a shape allows the first and second connecting portions 40 and 42 to have a spring property. In this way, it is possible to avoid stress concentration in the first and second connecting portions 40 and 42, being able to improve the breaking limit.

Figure 4A:
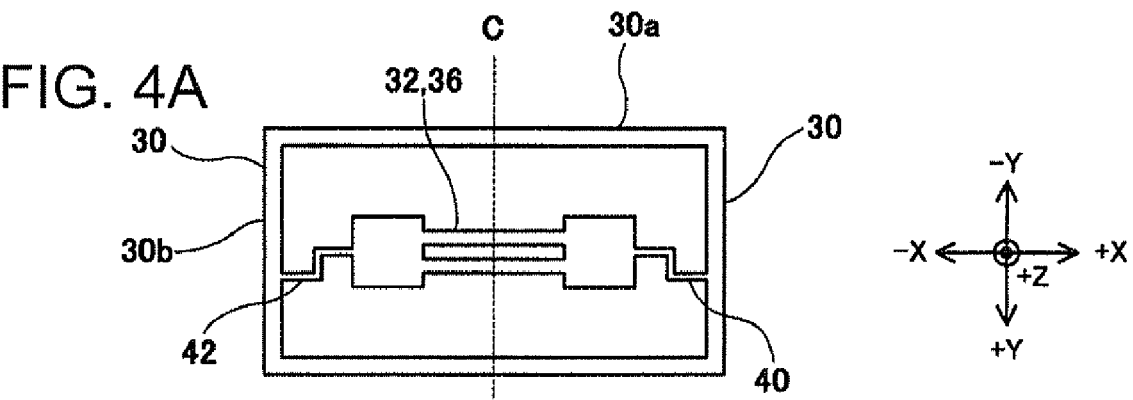
FIGS. 4A through 4D are schematic diagrams showing the first and second connecting portions in the first embodiment.
Figure 4B:
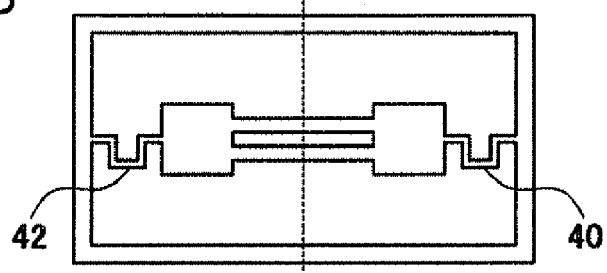
Figure 4C:
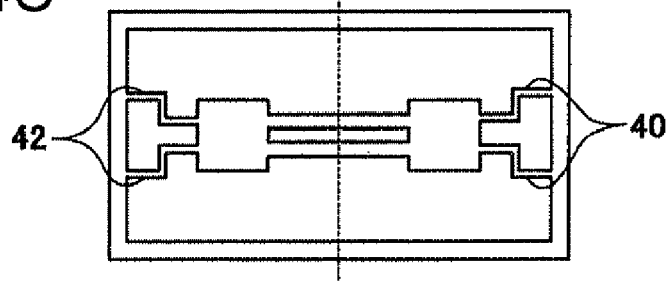
Figure 4D:
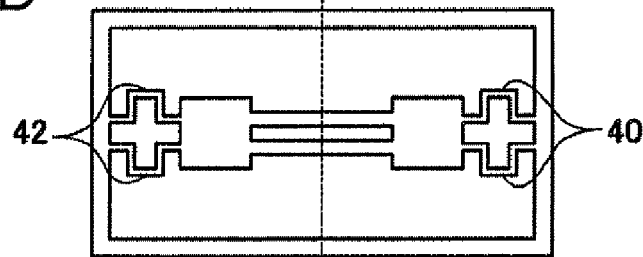

Further, as shown in FIGS. 4A and 4B, the first and second connecting portions 40 and 42 having an L-shape or a square C-shape can extend inwardly from short sides 30b of the pressure sensing element frame 30 and be connected to the first and second bases 34 and 38, respectively. Accordingly, the number of portions connecting the pressure sensing element frame 30 and the first and the first and second bases 34 and 38 is reduced, being able to prevent sensitivity deterioration of the pressure sensing element 32. In this case, as shown in FIGS. 4C (corresponds to FIG. 4A) and 4D (corresponds to FIG. 4B), two of the first and second connecting portions 40 and 42 may be respectively provided. In this way, the first and second connecting portions 40 and 42 are disposed symmetrically with respect to the longitudinal direction of the pressure sensing element 32 (the plus and minus X direction) so as to keep the balance. In a case where the first and second connecting portions 40 and 42 employ the form shown in FIG. 3B, 3D, 4A, 4B, 4C, or 4D, a mask used in photolithography-etching is easily produced. As a result, it is possible to realize stable mass production. Even though the first and second connecting portions 40 and 42 can take a plurality forms, the first and second connecting portions are axisymmetric with respect to the center line C so as not to cause a difference in mobility between the first base 34 and the second base 38.

An extraction electrode (not shown) is formed on the first connecting portion 40 or the second connecting portion 42. The extraction electrode is connected to an excitation electrode (not shown) formed on the resonating portion 36. The extraction electrode extends to the pressure sensing element frame 30 and is externally exposed. Accordingly, the pressure sensing element 32 can be electrically connected to the oscillation circuit (not shown) provided outside of the package, and can vibrate at a predetermined resonance frequency in response to an alternating voltage supplied from the oscillation circuit.

As an assembling procedure (refer to FIG. 2), on the first layer 12, the pressure sensing element layer 28 is stacked. At this time, the upper surface of the first periphery 14 is bonded to the lower surface of the pressure sensing element frame 30 while the upper surface of the first projection 18 is bonded to the lower surface of the first base 34.

Subsequently, on the pressure sensing element layer 28 stacked on the first layer 12, the second layer 20 is stacked. At this time, the upper surface of the pressure sensing element frame 30 is bonded to the lower surface of the second periphery 22 while the lower surface of the second projection 26 is bonded to the upper surface of the second base 38. If the second projection 26 and the second base 38 are bonded together while a plummet (not shown) is placed on the upper surface of the second layer 20 at a position opposed to the second projection 26, the second connecting portion 42 holding the second base 38 exerts drag against a load of the plummet. Thus, adhesion between the second projection 26 and the second base 38 is increased, improving bonding strength therebetween.

Each layer may be bonded by any of the following bonding methods. The bonding methods include: a method using low-melting glass; a method in which a bonding member is used that includes alkoxide or an organosiloxy group and is irradiated with energy rays, such as ultraviolet rays, so as to be activated; and a eutectic bonding method in which a coating film formed of a eutectic alloy, such as a gold-tin alloy, is used as a bonding member. As a matter of course, solid-phase bonding described below may be employed.

After stacking the first layer 12, the pressure sensing element layer 28, and the second layer 20 in this order, a sealing hole (not shown) is formed in a side surface of any of the first periphery 14 of the first layer 12, the pressure sensing element frame 30 of the pressure sensing element layer 28, and the second periphery 22 of the second layer 20, for example. Then, the pressure sensor element 10 is vacuumed from the sealing hole and the sealing hole is sealed. In this way, the pressure sensor element 10 is formed.

The operation of the pressure sensor element 10 having the above structure, according to the first embodiment, will be described with reference to FIGS. 5A through 5C and FIGS. 6A through 6C. As a comparative example, stress caused by acceleration applied to a pressure sensing element in a pressure sensor element will be described in FIGS. 5A through 5C. The pressure sensor element used to measure absolute pressure has the same structure as that of related art. Though each diaphragm slightly bends and deforms by pressure or acceleration, the bending deformation is shown exaggerated for better understanding in FIGS. 5A through 5C and FIGS. 6A through 6C.

Figure 5A:
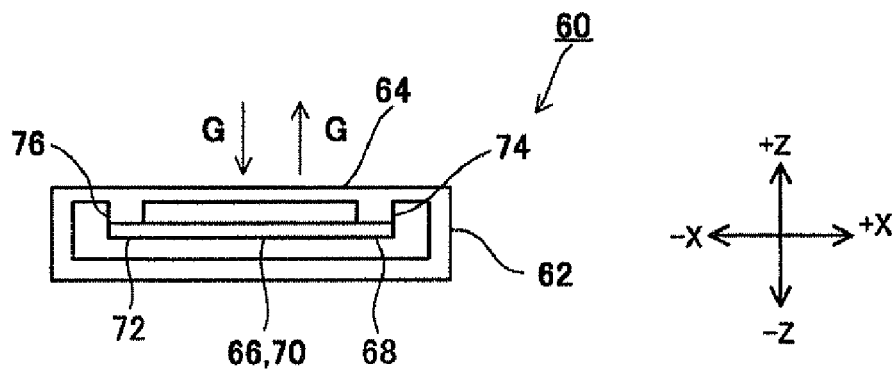
FIGS. 5A through 5C are diagrams showing an operation of a pressure sensor serving as a comparative example.

As shown in FIG. 5A, a pressure sensor element 60 according to the comparative example includes a package 62, a diaphragm 64 formed on a surface of the package 64, and a pressure sensing element 66 vacuum-sealed in the package 62. The pressure sensing element 66 includes a first base 68, a resonating portion 70, and a second base 72 in a longitudinal direction thereof, and is disposed such that the longitudinal direction (the plus and minus X direction) is orthogonal to a displacement direction of the diaphragm 64 (the plus and minus Y direction). The first base 68 is connected to a first support 74 formed inwardly from the diaphragm 64 while the second base 72 is connected to a second support 76 formed inwardly from the diaphragm 64. As described in related art, in a case where the pressure sensor is installed within a vehicle and the like such that the normal of the diaphragm 64 is in the vertical direction (the plus and minus Z direction) and the vehicle and the like run onto a step, acceleration in the −Z direction and acceleration in the +Z direction are applied to the pressure sensor element 60 as shown in FIG. 5A.

Figure 5B:
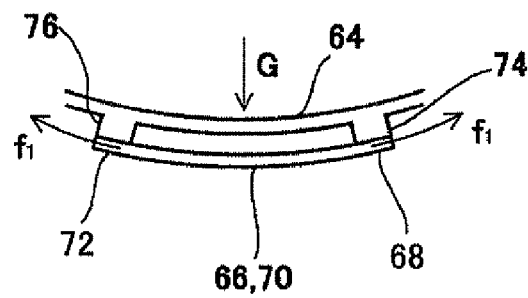

As shown in FIG. 5B, when acceleration G in the −Z direction is applied to the pressure sensor element 60, the diaphragm 64 bends and deforms in the −Z direction, and is displaced in the −Z direction. The first support 74 is displaced in the −Z direction while force f1 in substantially the +X direction is given to the first base 68. Further, the second support 76 is displaced in the −Z direction while the force f1 in substantially the −X direction is given to the second base 72. Accordingly, the resonating portion 70 receives tensile stress from both ends, thereby increasing the resonance frequency.

Figure 5C:
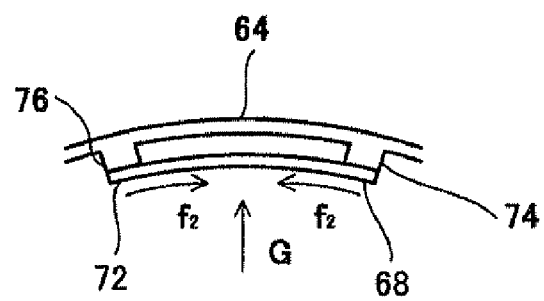

On the other hand, as shown in FIG. 5C, when the acceleration G in the +Z direction is applied to the pressure sensor element 60, the diaphragm 64 bend and deforms in the +Z direction, and is displaced in the +Z direction. The first support 74 is displaced in the +Z direction while force f2 in substantially the −X direction is given to the first base 68. Further, the second support 76 is displaced in the +Z direction while the force f2 in substantially the +X direction is given to the second base 72. Accordingly, the resonating portion 70 receives compressive stress from both ends, thereby decreasing the resonance frequency.

In this way, a direction of force that the resonating portion 70 of the pressure sensing element 66 receives changes in accordance with a direction in which acceleration is applied. Therefore, the inventor has concluded that it is possible to cancel variations of resonance frequency caused by unwanted deformation due to the acceleration added to the pressure sensor element 10 if the force exerted on the first base 34 and the force exerted on the second base 38 cancel out each other as the follows.

Figure 6A:
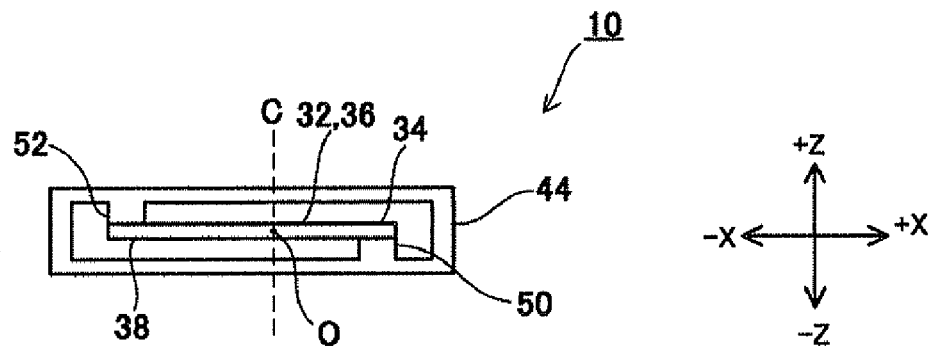
FIGS. 6A through 6C are diagrams showing an operation of a pressure sensor of the first embodiment.
Figure 6B:
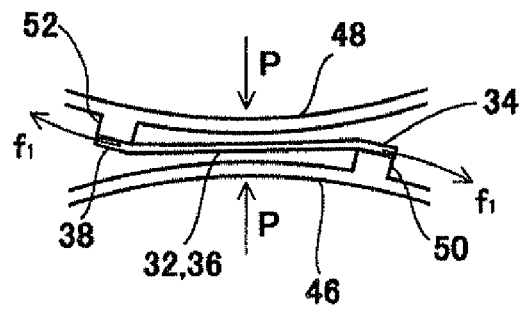
Figure 6C:
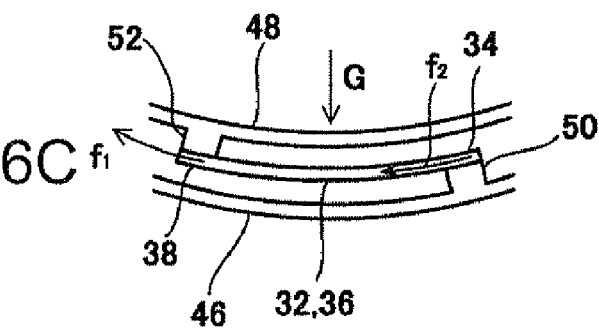

FIGS. 6A through 6C show the operation of the pressure sensor element according to the first embodiment upon receipt of pressure and acceleration. FIG. 6A is a schematic diagram showing the pressure sensor element when it receives neither pressure nor acceleration. FIG. 6B is a schematic diagram showing the pressure sensor element when it receives pressure P. FIG. 6C is a schematic diagram showing the pressure sensor element when it receives the acceleration G.

As shown in FIG. 6B, when the pressure P is applied to the pressure sensor element 10, the first diaphragm 46 is displaced in the +Z direction while the second diaphragm 48 is displaced in the −Z direction. The first support 50 is displaced in the +Z direction while the force f1 in substantially the +X direction is given to the first base 34. The second support 52 is displaced in the −Z direction while the force f1 in substantially the −X direction is given to the second base 38. Upon the receipt of the force f1 from both ends, the resonating portion 36 receives tensile stress. Consequently, the oscillation frequency is increased, and the pressure can be detected.

On the other hand, as shown in FIG. 6C, when the acceleration G in −Z direction is applied to the pressure sensor element 10, the first and second diaphragms are displaced in the −Z direction. The first support 50 is displaced in the −Z direction while the force f in substantially the −X direction is given to the first base 34. Meanwhile, the second support 52 is displaced in the −Z direction while the force f1 in substantially the −X direction is given to the second base 38. Here, the first and second diaphragms 46 and 48 have the same characteristics to pressure. In addition, the first and second supports 50 and 52 have the same dimension, and the pressure sensing element 32 is axisymmetric with respect to the center line C. If the pressure sensor element 10 is rotated by 180 degrees, a position of the first and second supports 50 and 52 overlaps with each other's position, and a position of the first and second bases 34 and 38 overlaps with each other's position. Thus, the pressure sensor element 10 has 180 degree rotational symmetry with respect to a center O (refer to FIG. 6A). Since the magnitude of the force f1 and that of the force f2 are substantially the same, even if tensile stress is exerted on the first base 34, compressive stress is exerted on the second base 38. That is, different stress is exerted on each base, and the stresses exerted are canceled out each other. Accordingly, neither tensile stress nor compressive stress is exerted on the resonating portion 36, so that variations of resonance frequency due to the acceleration do not occur. Even if the acceleration G is applied in an opposite direction, variations of resonance frequency due to the acceleration do not occur in the same manner. That is because, as described above, the pressure sensor element has 180 degree rotational symmetry with respect to the center O.

In order to improve sensitivity of the pressure sensor element 10 according to the first embodiment, it is necessary to increase displacement of each diaphragm by reducing a thickness of the diaphragm. However, in each of the first and second diaphragms 46 and 48, the thin area, such as the first and second recesses 16 and 24, is integrally formed with the thick area, such as the first and second projections 18 and 26 (the first and second supports 50 and 52) supporting the pressure sensing element 32. Thus, in order to form the thin area, it is necessary to use a thick plate substrate and perform a process to form the thin area in the plate substrate. Each diaphragm, however, may have the following problems when the process for forming the thin area is performed.

In a case where the diaphragm is formed of a quartz crystal substrate, the process is generally performed by photolithography-etching or sandblasting. When the process is performed by photolithography-etching, needle-like pores referred to as etching pipes (also referred to as etching channels, etching tubes, or etching tunnels) may be formed. The etching pipes are attributed to crystal strain that the quartz crystal substrate has. If the inside of the pressure sensor element 10 communicates with the outside by the etching pipes formed in the thin area of the diaphragm, the inside of the pressure sensor element 10 is not hermetically sealed. Thus, the pressure sensor element that includes the above-described diaphragm may not keep the vacuum state required for detecting absolute pressure. Meanwhile, when the process is performed by sandblasting with high pressure, the diaphragm may be damaged. This may cause cracks in the thin area of the diaphragm.

In order to avoid these problems, a thickness of the thin area of each diaphragm needs to be set thicker than a thickness which causes these problems. Accordingly, in the pressure sensor element 10 according to the first embodiment, it is disadvantageously hard to obtain better sensitivity by increasing displacement of each diaphragm by reducing the thickness of the diaphragm because of restrictions in processing due to the structure of the diaphragm. Consequently, the structure solving the problems above will be described in a second embodiment.

Figure 7:
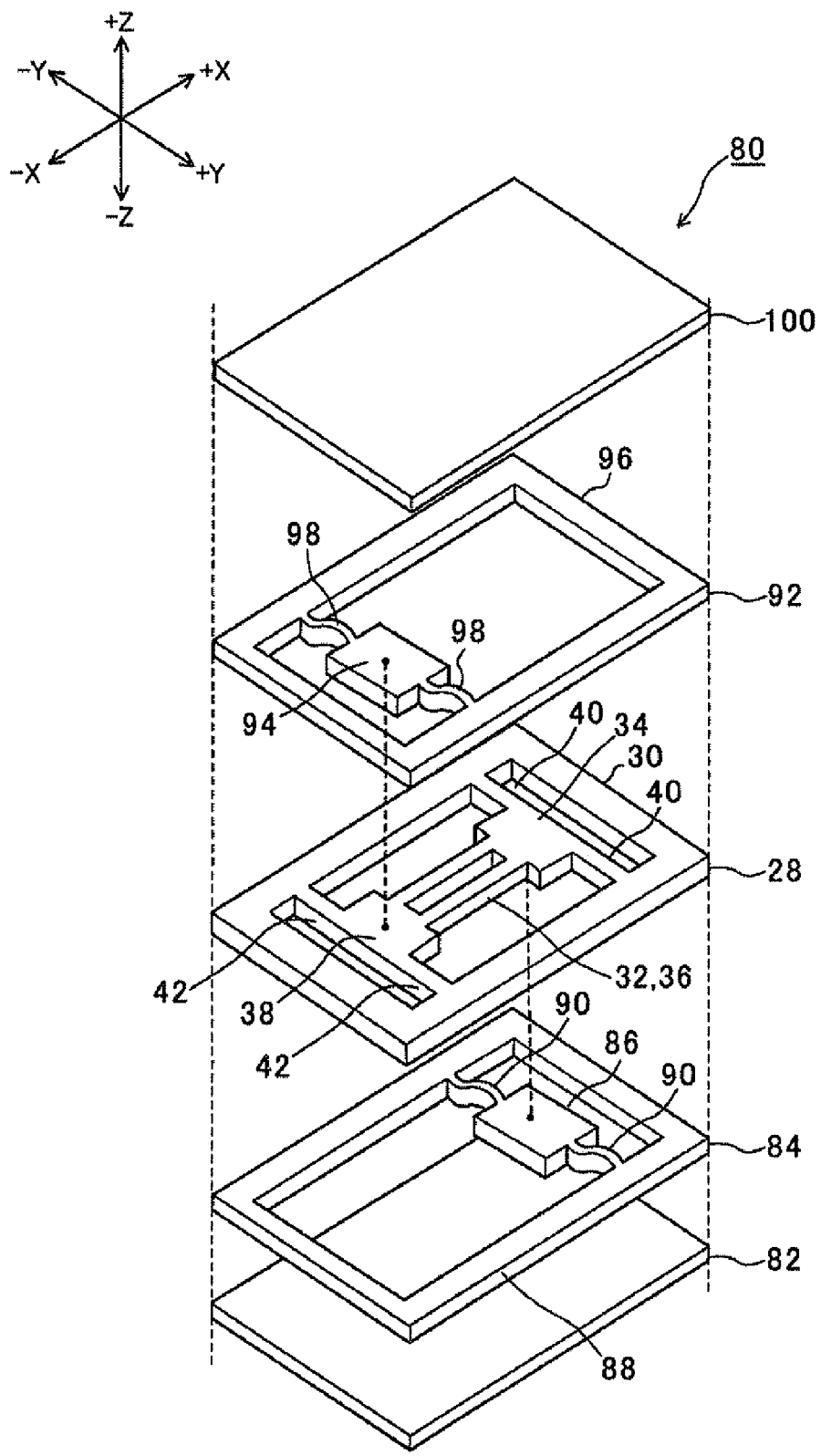
FIG. 7 is a diagram showing a stack structure of a pressure sensor element according to a second embodiment.

FIG. 7 shows a stack structure of a pressure sensor element 80 according to the second embodiment. The pressure sensor element 80 is formed of quartz crystal, for example, and includes a first diaphragm layer 82, a first support layer 84, the pressure sensing element layer 28, a second support layer 92, and a second diaphragm layer 100. These five layers are stacked in this order. The first layer 12 in the first embodiment corresponds to a stack of the first diaphragm layer 82 and the first support layer 84 while the second layer 20 corresponds to a stack of the second support layer 92 and the second diaphragm layer 100. The pressure sensing element layer 28 is in common with that in the first embodiment.

The first and second diaphragm layers 82 and 100 are a rectangular plate formed of quartz crystal. The first and second diaphragm layers 82 and 100 are formed as follows. A quartz crystal plate (not shown) cut from a raw quartz crystal is polished to a predetermined thickness by lapping. The quartz crystal plate is mirror polished so as to increase its flatness. Further, a surface of the quartz crystal plate is etched by a diluted hydrofluoric acid or the like so as to reduce residual stress thereon. In this way, a work-affected layer, such as processed traces, is removed, and thus each diaphragm layer is formed. Since the etching of the quartz crystal plate or the process to form the thin area by sandblasting are not performed, a thin plate can be easily formed without forming etching pipes and cracks as described in the first embodiment.

The first support layer 84 includes a first support 86, a first support frame 88 surrounding the first support 86, and a first beam 90 extending from the first support frame 88 and being connected to the first support 86. The first support 86 is connected to the first diaphragm layer 82 so as to form the first projection 18 in the first embodiment. The first support frame 88 is connected to the first diaphragm layer 82 so as to form the first periphery 14 and the first recess 16 in the first embodiment. Further, the first diaphragm layer 82 is connected to the first support layer 84 so as to form the first diaphragm 46 in the first embodiment.

The second support layer 92 includes a second support 94, a second support frame 96 surrounding the second support 94, and a second beam 98 extending from the second support frame 96 and being connected to the second support 94. The second support 94 is connected to the second diaphragm layer 100 so as to form the second projection 26 in the first embodiment. The second support frame 96 is connected to the second diaphragm layer 100 so as to form the second periphery 22 and the second recess 24 in the first embodiment. Further, the second diaphragm layer 100 is connected to the second support layer 92 so as to form the second diaphragm 48 in the first embodiment.

The first and second beams 90 and 98 have a member extending in a direction orthogonal to the longitudinal direction (the plus and minus X direction) of the pressure sensing element 32 in the same manner as the first and second connecting portions 40 and 42. Accordingly, when the first and second supports 86 and 94 are displaced in the longitudinal direction, the member orthogonal to the longitudinal direction can bend in the longitudinal direction at the first and second beams 90 and 98. Thus, the first and second supports 86 and 94 can easily be displaced in the longitudinal direction. The first and second beams 90 and 98 can take several forms as shown in FIGS. 8A through 8D and FIGS. 9A through 9D in the same manner as the first and second connecting portions 40 and 42. As shown in FIG. 8A, the first and second beams 90 and 98 have a wave shape. The first beam 90 extends inwardly from long lines 88*a* of the first support frame 88 while the second beam 98 extends inwardly from long lines 96*a* of the second support frame 96. Accordingly, the first and second beams 90 and 98 have a spring property. This makes it possible to avoid stress concentration in the first and second beams 90 and 98, being able to improve the breaking limit. As shown in FIGS. 8B and 8C, in a case where the first and second beams 90 and 98 having an L-shape or a square C-shape, the member orthogonal to the longitudinal direction of the first and second beams 90 and 98 can bend in the longitudinal direction at a position being bent at a right angle.

As shown in FIG. 8D, the first beam 90 can extend in a diagonal direction from corners inside of the first support frame 88 and be connected to the first support 86 while the second beam 98 can extend in a diagonal direction from corners inside of the second support frame 96 and be connected to the second support 94. In addition, the first and second beams 90 and 98 may have a wave shape as shown in FIG. 8A in this state. Such a shape allows the first and second beams 90 and 98 to have a spring property. As a result, it is possible to avoid stress concentration in the first and second beams 90 and 98, being able to improve the breaking limit.

Figure 9A:
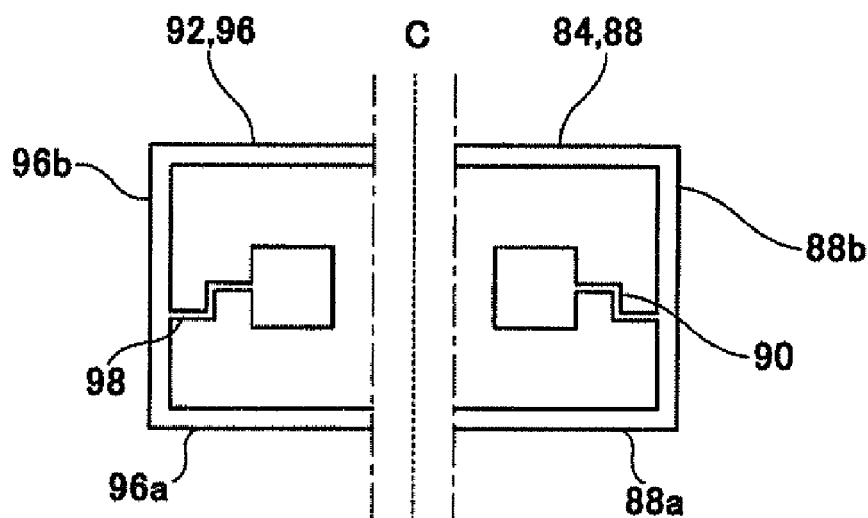
FIGS. 9A through 9D are schematic diagrams showing the first and second beams in the second embodiment.
Figure 9B:
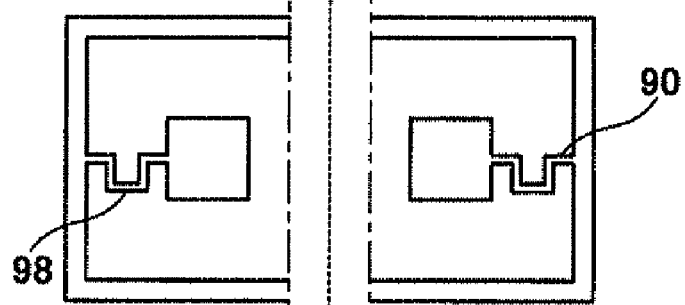
Figure 9C:
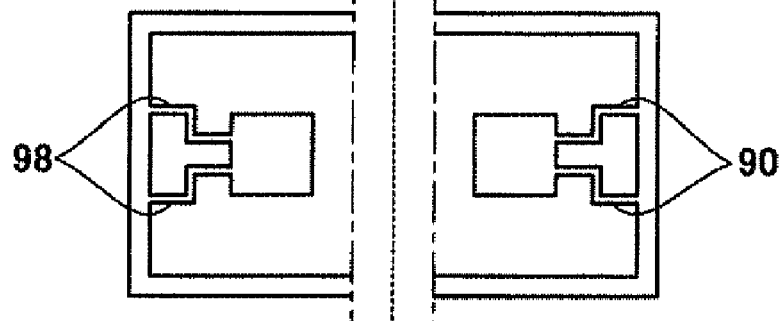
Figure 9D:
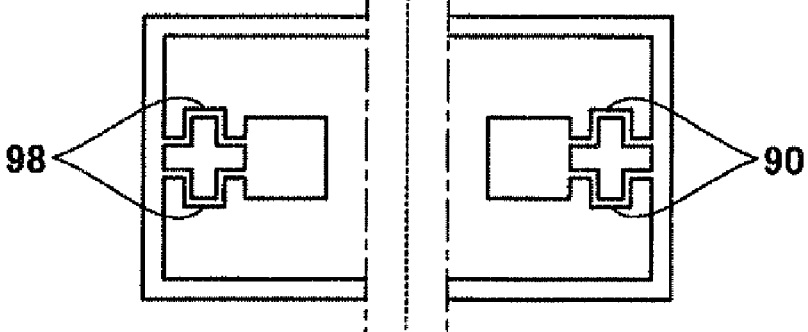

Further, as shown in FIGS. 9A and 9B, the first beam 90 having an L-shape or a square C-shape can extend inwardly from short sides 88*b* of the first support frame 88 and be connected to the first support 86 while the second beam 98 having an L-shape or a square C-shape can extend inwardly from short sides 96b of the second support frame 96 and be connected to the second support 94. In this way, the number of portions connecting the pressure sensing element 32 and the first and second supports 86 and 94 is reduced, being able to prevent sensitivity deterioration of the pressure sensing element 32. In this case, as shown in FIGS. 9C (corresponds to FIG. 9A) and 9D (corresponds to FIG. 9B), two of the first and second beams 90 and 98 may be respectively provided. Accordingly, the first and second beams 90 and 98 are disposed symmetrically with respect to the longitudinal direction of the pressure sensing element 32 (the plus and minus X direction) so as to keep the balance. In a case where the first and second beams 90 and 98 employ the form shown in FIG. 8B, 8C, 9A, 9B, 9C, or 9D, a mask used in photolithography-etching is easily produced. As a result, it is possible to realize stable mass production. Even though the first and second beams 90 and 98 can take a plurality forms, the first and second beams are axisymmetric with respect to the center line C so as not to cause a difference in mobility between the first support 88 and the second support 94.

The first diaphragm layer 82 and the first support layer 84 as well as the second support layer 92 and the second diaphragm layer 100 are solid-phase bonded to each other so as to assemble the pressure sensor element 80 according to the second embodiment.

Here, the solid-phase bonding is a method for bonding solids to each other without using an adhesive. Examples of the solid-phase bonding include direct bonding, metal bonding, and anodic bonding in the present embodiment. The direct bonding is performed as follows, for example. A thin oxide film is formed on a bonding surface of each quartz crystal substrate whose flatness is secured. The thin oxide film is formed by slightly oxidizing the surface with a chemical agent, such as acid. At the same time, the surface is treated to be hydrophilic so that hydroxyl groups adhere to the surface. The bonding surfaces, which are treated to be hydrophilic, are made contact with each other so that the hydroxyl groups opposed to each other are bonded by hydrogen bonding. Thereafter, the hydroxyl groups are removed in the form of water by a heat treatment. In the direct bonding, no new bonding film is formed on the bonding surface.

The metal bonding is performed as follows. A metal film, such as an Au film, having a thickness of approximately 0.1 µm is formed by sputtering on a bonding surface of each quartz crystal substrate whose flatness is secured. A surface of each metal film is irradiated with plasma so as to be activated. The activated surfaces of the respective metal films are made contact with each other. Metal atoms that are activated by heating and pressurizing are diffused from the bonding surfaces so that the films made contact are integrally bonded. After the bonding, a bonding film formed of the metal film having a thickness of approximately 0.2 µm is formed.

The anodic bonding is produced by a chemical reaction in which metal in a bonding interface is oxidized. In a case where a quartz crystal substrate is anodically bonded to a glass member, a metal film, such as aluminum, is formed by sputtering on a bonding surface of the quartz crystal substrate whose flatness is secured. A bonding surface of the glass member whose flatness is secured is made contact with a surface of the metal film. Here, metal ion, such as sodium, is generally contained in the glass member. Thus, metal required for the bonding exists near the bonding surface of the glass member, enabling the anodic bonding. When the quartz crystal substrate and the glass member are anodically bonded, the metal film serves as an anode and a cathode is disposed on the bonding surface of the glass member. Then, an electric field is applied between the anode and the cathode. In this way, the metal ion, such as sodium, contained in the glass member moves to the cathode. Accordingly, an amount of oxygen ion is increased in the vicinity of the bonding surface, being in a state in which electric double layer is formed. As a result, the metal film, which is made contact with the glass member, is oxidized, and thereby the metal film and the glass member are bonded together. After the bonding, a bonding film having a thickness of approximately 0.1 µm is formed.

Sufficient bonding strength is obtained by the above bonding methods with less bonding area compared with a case using a conductive paste. In the embodiment, it is possible to bond wafers together with sufficient bonding strength with a bonding with of approximately 100 µm to 300 µm.

The first support 86 is solid-phase bonded to the first diaphragm layer 82, and the second support 94 is solid-phase bonded to the second diaphragm layer 100. At this time, however, the first beam 90 is not bonded to the first diaphragm layer 82, and the second beam 98 is not bonded to the second diaphragm layer 100. In this way, displacement of the first and second supports 86 and 94 is not prevented.

Subsequently, the upper surface of the first support frame 88 is bonded to the lower surface of the pressure sensing element frame 30, and the upper surface of the first support 86 is bonded to the lower surface of the first base 34. Then, the upper surface of the pressure sensing element frame 30 is bonded to the lower surface of the second support frame 96, and the upper surface of the second base 38 is bonded to the lower surface of the second support 94.

Each layer may be bonded by any of the following bonding methods. The bonding methods include: a method using low-melting glass; a method in which a bonding member is used that includes alkoxide or an organosiloxy group is irradiated with energy rays, such as ultraviolet rays, so as to be activated; and a eutectic bonding method in which a coating film formed of a eutectic alloy, such as a gold-tin alloy, is used as a bonding member. As a matter of course, the solid-phase bonding described above may be employed.

In addition, when the first diaphragm layer 82 is bonded to the first support layer 84 and the second diaphragm layer 100 is bonded to the second support layer 92, the first diaphragm layer 82 may be solid-phase bonded to the first support 86 and the second diaphragm 100 may be solid-phase bonded to the second support 94 while the rest may be bonded by the bonding method described above.

After stacking the first diaphragm layer 82, the first support layer 84, the pressure sensing element layer 28, the second support layer 92, and the second diaphragm layer 100 in this order, a sealing hole (not shown) is formed in a side surface of any of the first support frame 88 of the first support layer 84, the pressure sensing element frame 30 of the pressure sensing element layer 28, and the second support frame 96 of the second support layer 92, for example. Then, the pressure sensor element 80 is vacuumed from the sealing hole and the sealing hole is sealed. In this way, the pressure sensor element 80 is formed.

Though the stack structure in the second embodiment is more complex than that in the first embodiment, the process to form the thin area by photolithography-etching, sandblasting, or the like is not necessary. As a result, it is possible to avoid forming etching pipes and cracks in each diaphragm layer.

The pressure sensor element 10 according to the first embodiment and the pressure sensor element 80 according to the second embodiment serve as a pressure sensor by being mounted on a substrate for the pressure sensor.

Figure 10A:
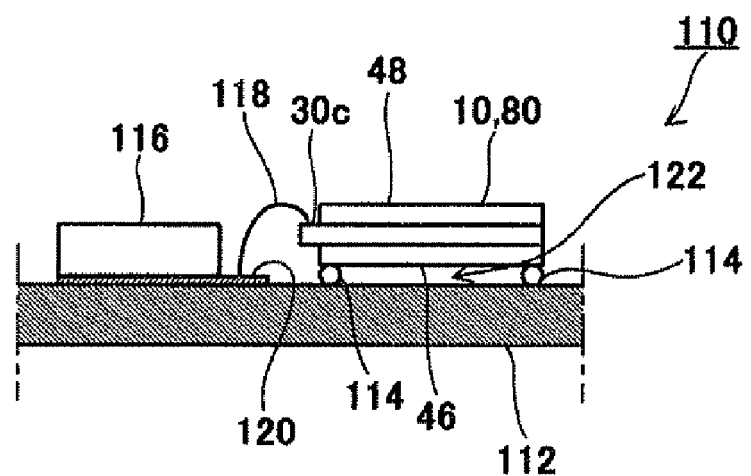
FIGS. 10A and 10B are schematic diagrams showing a pressure sensor according to a third embodiment.
Figure 10B:
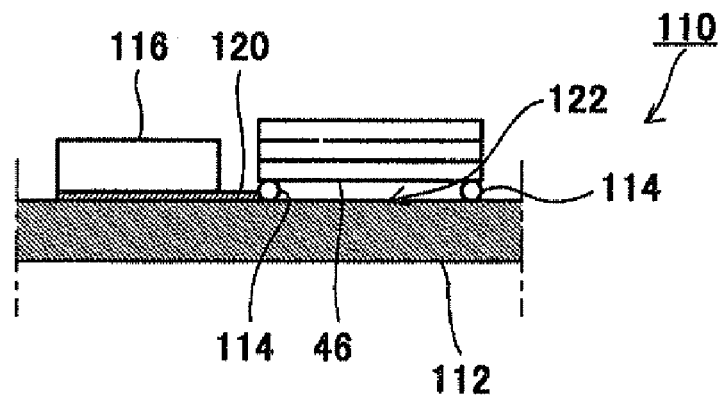

FIGS. 10A and 10B show a pressure sensor 110 according to a third embodiment. As shown in FIG. 10A, the pressure sensor 110 according to the third embodiment includes a substrate 112 on which the pressure sensor element 10 or 80 is mounted, bumps 114 provided on the substrate 112 at a position that makes contact with the pressure sensor element 10 or 80 so as to form a space therebetween, and a driving circuit 116 electrically connected to the pressure sensor element 10 or 80 so as to drive the pressure sensor element. The driving circuit 116 is electrically connected to the pressure sensor element 10 or 80 with a wiring line 118 formed of Au or the like by wire bonding.

The pressure sensor element 10 or 80 includes an extension portion 30c at a portion of the pressure sensing element frame 30 of the pressure sensing element layer 28. The extraction electrode (not shown) is extracted on the upper surface of the extension portion 30c. The extraction electrode is connected to the excitation electrode (not shown) of the pressure sensing element 32. On the substrate 112, the driving circuit 116 is mounted and a connection electrode 120 connected to the driving circuit 116 is provided. Four of the bumps 114 having a predetermined thickness are provided on the substrate 112. Each of the bumps 114 is disposed at a position corresponding to a corner of the first layer 12 (the first diaphragm layer 82) which is opposed to the substrate 112. The pressure sensor element 10 or 80 is fixed to the substrate 112 through the bumps 114 by insonifying the bumps 114 in a state such that the first layer 12 (the first diaphragm layer 82) is opposed to the substrate while the pressure sensor element 10 or 80 is pressed against the bumps 114. Further, the extraction electrode (not shown) is wire bonded to the connection electrode 120 with the wiring line. Accordingly, the driving circuit 116 is electrically connected to the pressure sensing element 32. The driving circuit 116 is electrically connected to the pressure sensor element 10 or 80 by wire bonding. This allows more freedom in the arrangement of the driving circuit 116 as well as the pressure sensor element 10 or 80 on the substrate 112. The pressure sensor element 10 or 80 is connected to the substrate 112 through the bumps 114, and a space 122 is formed between the pressure sensor element and the substrate 112. Thus, in the pressure sensor 110, degradation of the response of the first layer 12 (the first diaphragm layer 82) opposed to the substrate 112 to pressure is prevented and the first layer 12 (the first diaphragm layer 82) can easily bend toward the substrate 112.

Further, as shown in FIG. 10B, the pressure sensor 110 may have the following structure. The extraction electrode is extracted to a side in the first layer 12 (the first diaphragm layer 82). The bumps 114, which are a conductor connected to the connection electrode 120, are disposed on the substrate 112 at a position opposed to the extraction electrode. The bumps 114 are insonified in a state such that the pressure sensor element 10 or 80 is pressed against the bumps 114. Accordingly, the pressure sensor element 10 or 80 is fixed to the substrate 112 through the bumps 114 while the driving circuit 116 is electrically connected to the pressure sensor element. In this way, it is possible to reduce an area and volume of the substrate 112 required for the mounting the pressure sensor element, thus being able to achieve the downsized pressure sensor 110.

Figure 11A:
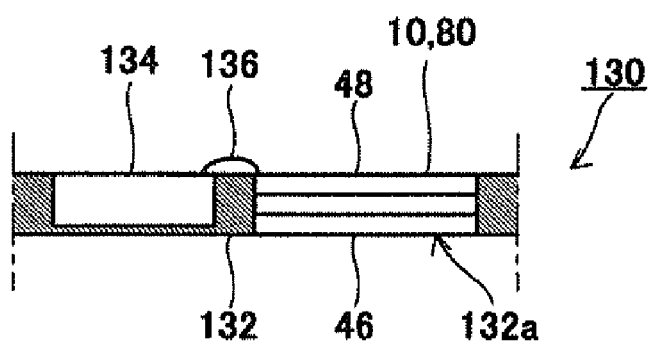
FIGS. 11A and 11B are schematic diagrams showing a pressure sensor according to a fourth embodiment.
Figure 11B:
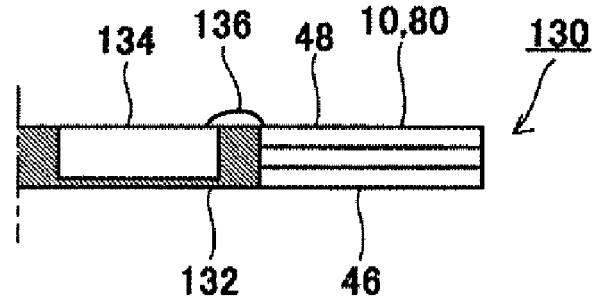

FIGS. 11A and 11B show a pressure sensor according to a fourth embodiment. As shown in FIG. 11A, a pressure sensor 130 according to the fourth embodiment includes the pressure sensor element 10 according to the first embodiment or the pressure sensor element 80 according to the second embodiment, a substrate 132 on which the pressure sensor element is mounted, and a driving circuit 134 electrically connected to the pressure sensor element so as to drive the pressure sensor element. In the pressure sensor 130, any one of the side surfaces of the pressure sensor element 10 or 80 is bonded to the substrate 132.

The substrate 132 on which the pressure element 10 or 80 is mounted has a through-hole 132a. The through-hole 132a has a shape corresponding to the outline (the XY-plane) of the pressure sensor element 10 or 80, so that the pressure sensor element is set into the through-hole 132a and bonded thereto with an adhesive, for example. In this case, all the side surfaces of the pressure sensor element are bonded to the substrate, and surfaces that include the first and second diaphragms 46 and 48 are open. However, the side surface of the pressure sensor element may be bonded to the side surface of the substrate 132 having the same thickness as that of the pressure sensor element.

Accordingly, the first diaphragm 46 (the first layer 12 and the first diaphragm layer 82) and the second diaphragm 48 (the second layer 20 and the second diaphragm layer 100) are not interfered by the substrate 132 during pressure measurement. Thus, it is possible to realize the pressure sensor 130 that reduces errors in a pressure measurement value caused by acceleration while being reduced in height.

Further, as shown in FIGS. 11A and 11B, the driving circuit 134 may also be buried in the substrate 132. The driving circuit 134 may be connected to the pressure sensor element 10 or 80 by wire bonding the extraction electrode (not shown) to a predetermined electrode (not shown) on the active surface of the driving circuit 134 with a wire line 136. The extraction electrode is extracted to the first layer 12 or the first diaphragm layer 82 (it may be the second layer 20 or the second diaphragm 100).

Figure 12:
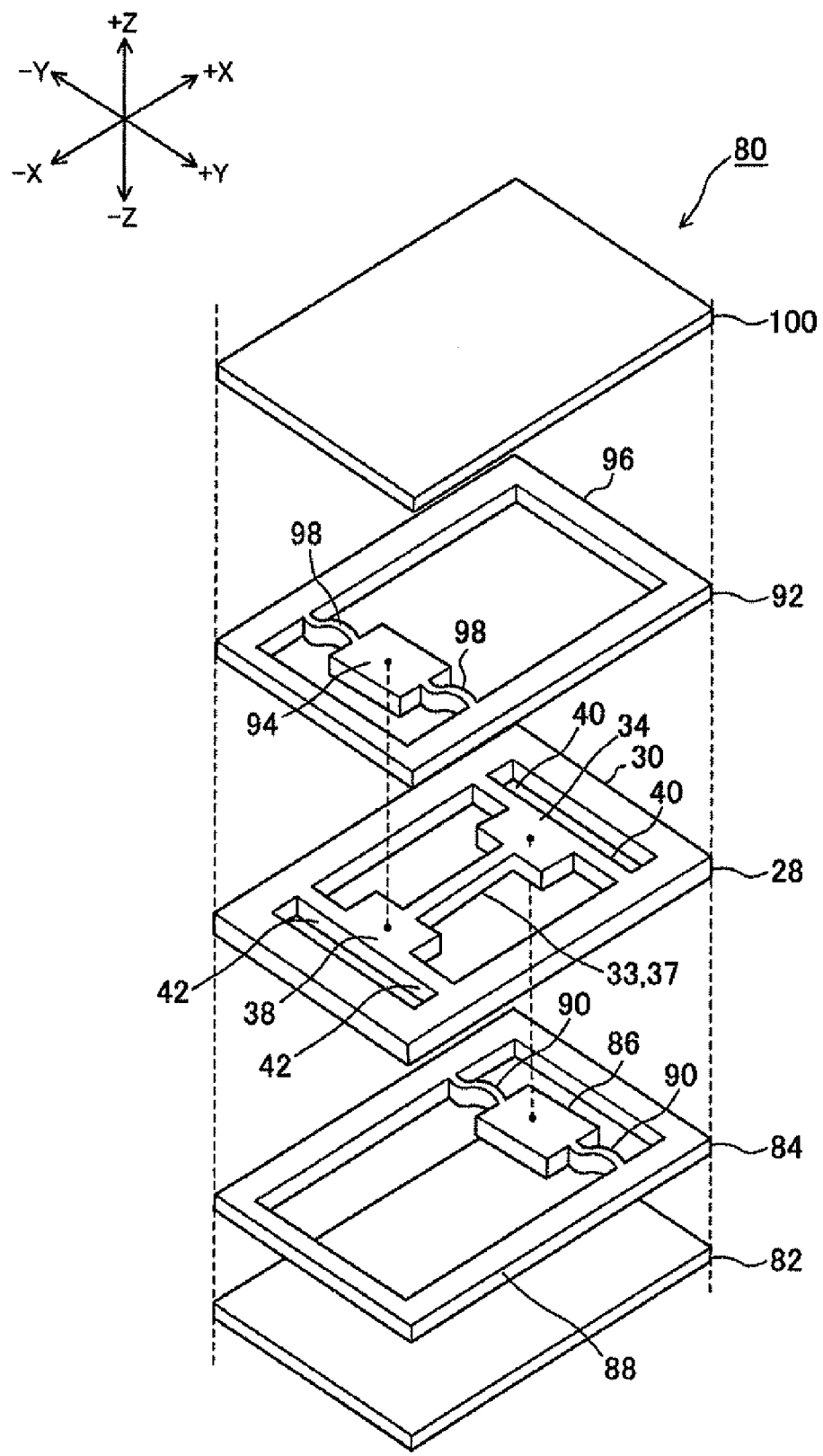
FIG. 12 is a schematic diagram showing a modification of a pressure sensing element.
Figure 13:
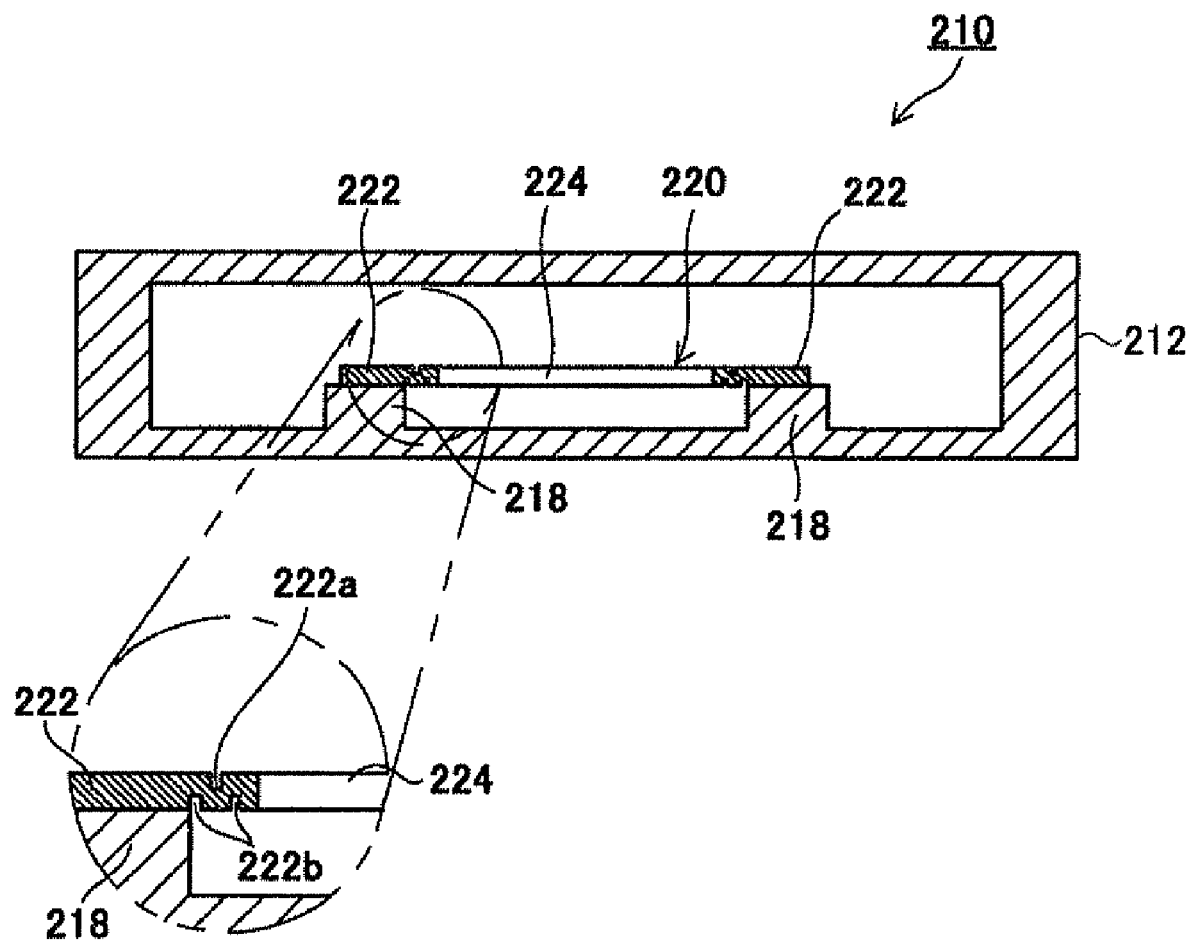
FIG. 13 is a schematic diagram showing a piezoelectric resonator element for a pressure sensor according to a first example of related art.
Figure 14A:
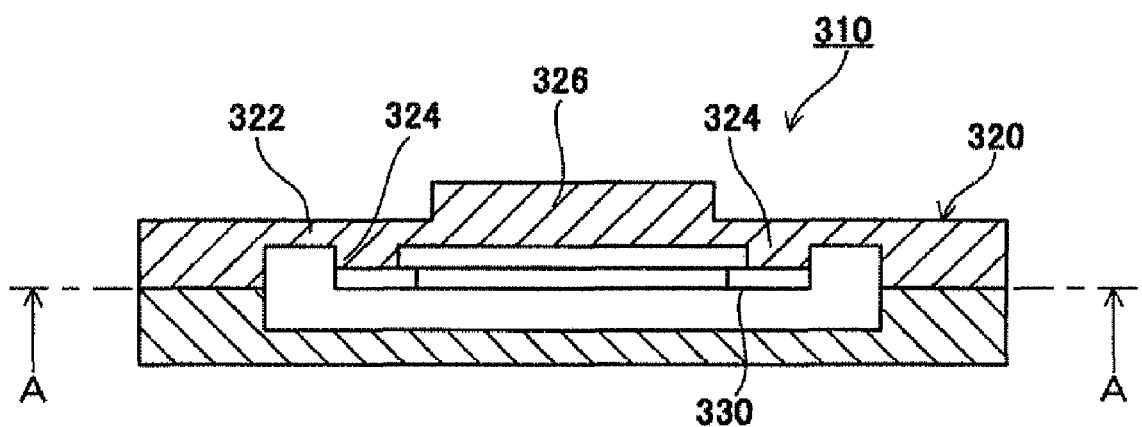
FIGS. 14A and 14B are schematic diagrams showing a diaphragm for a pressure sensor according to a second example of related art.
Figure 14B:
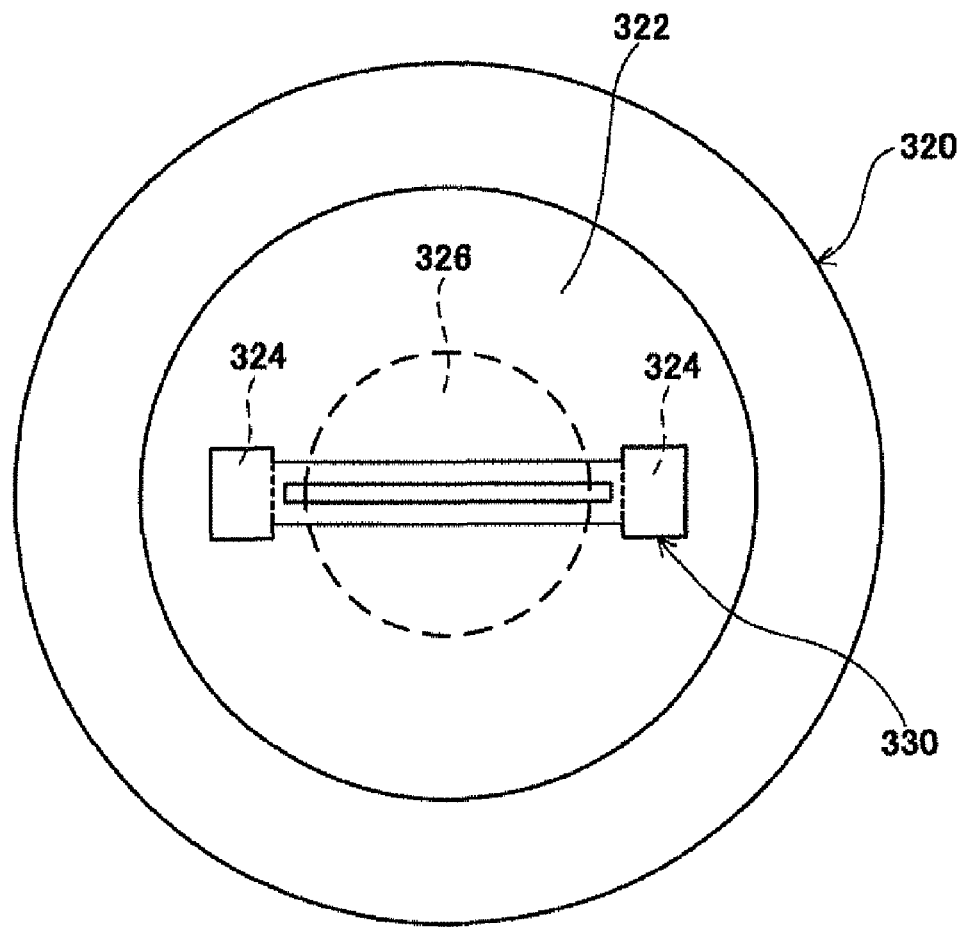
Figure 15:
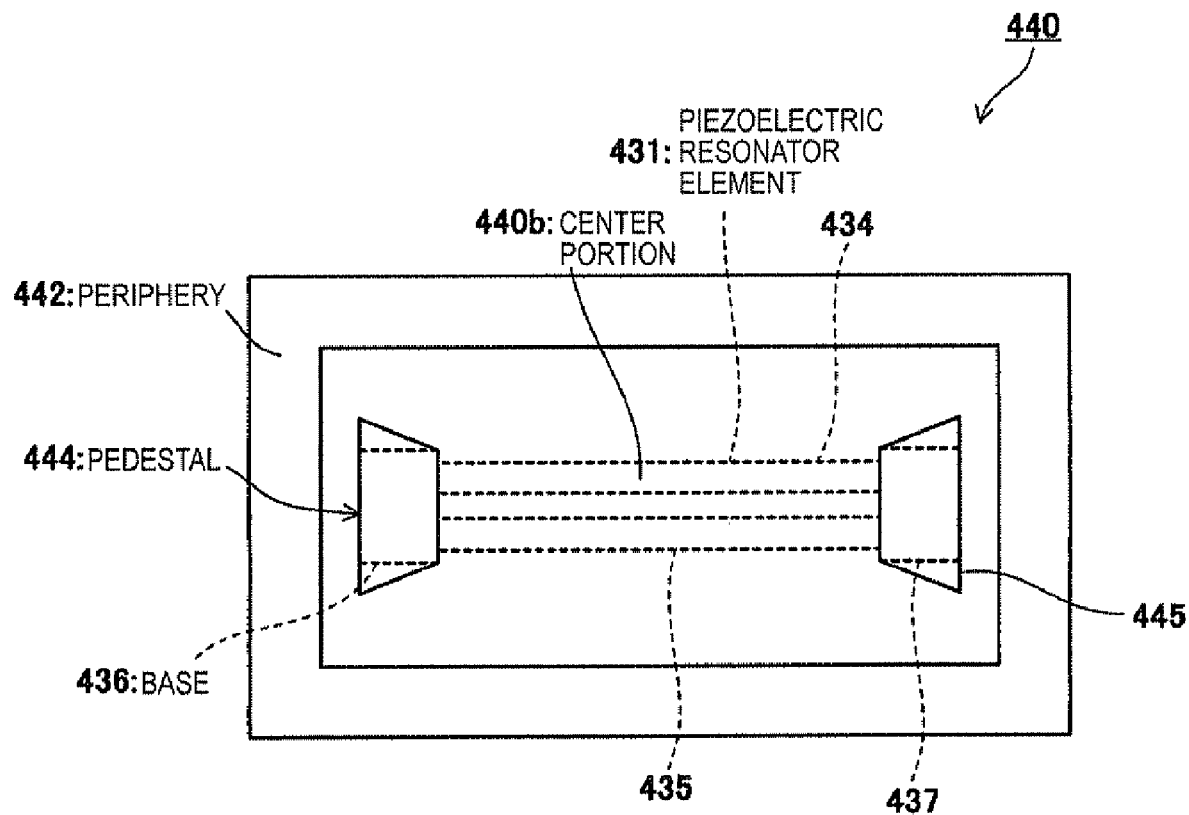
FIG. 15 is a schematic diagram showing a pressure sensing element for a pressure sensor according to a third example of related art.

In the embodiments above, a double-ended tuning fork type piezoelectric resonator is employed in which the pressure sensing element 32 has a resonating portion formed of two beams. However, as shown in FIG. 12, a single-beam type piezoelectric resonator may be employed in which a pressure sensing element 33 has a resonating portion 37 formed of a single beam.

The entire disclosure of Japanese Patent Application No. 2009-044221, filed Feb. 26, 2009 is expressly incorporated by reference herein.

What is claimed is:

1. A pressure sensor element, comprising:
   a package;
   a first diaphragm provided on a first surface of the package;
   a second diaphragm provided on a second surface of the package; and
   a pressure sensing element disposed in the package, the pressure sensing element including:
      a first base formed at one end in a longitudinal direction of the pressure sensing element;
      a second base formed at the other end in the longitudinal direction; and
      a resonating portion formed between the first base and the second base, wherein the first and second surfaces are opposed to each other, wherein the pressure sensor element is disposed such that the longitudinal direction is orthogonal to a displacement direction of each of the first and second diaphragms, and wherein the first base is connected to the first diaphragm while the second base is connected to the second diaphragm.

2. A pressure sensor element, comprising:
   a pressure sensing element layer, the pressure sensor element including:
      a resonating portion detecting displacement;

a first base formed at one end in a longitudinal direction of the resonating portion;
a second base formed at the other end in the longitudinal direction;
a pressure sensing element frame surrounding the resonating portion, the first base, and the second base;
a first connecting portion connecting the pressure sensing element frame and the first base; and
a second connecting portion connecting the pressure sensing element frame and the second base;
a first layer displaced by receiving force, the first layer including:
a first periphery formed on a surface opposed to the pressure sensing element layer;
a first recess that is formed inside the first periphery and displaced by receiving the force; and
a first projection formed in the first recess so as to oppose to the first base; and
a second layer displaced by receiving the force, the second layer including:
a second periphery formed on a surface opposed to the pressure sensing element layer;
a second recess that is formed inside the second periphery and displaced by receiving the force; and
a second projection formed in the second recess so as to oppose to the second base, wherein the pressure sensing layer is formed between the first and second layers and detects the displacement, wherein the first periphery, the pressure sensing element frame, and the second periphery are sequentially stacked, and wherein the first base is connected to the first projection while the second base is connected to the second projection.

3. The pressure sensor element according to claim 2, wherein the first and second connecting portions include a member extending in a direction orthogonal to the longitudinal direction.

4. The pressure sensor element according to claim 2, wherein the first layer is a stack structure of a first diaphragm layer and a first support layer while the second layer is a stack structure of a second support layer and a second diaphragm layer, wherein the first support layer includes a first support, a first support frame surrounding the first support, a first beam extending from the first support frame and being connected to the first support, wherein the first support is connected to the first diaphragm layer so as to form the first projection while the first support frame is connected to the first diaphragm layer so to form the first periphery and the first recess, wherein the second layer includes a second support, a second support frame surrounding the second support, and a second beam extending from the second support frame and being connected to the second support, and wherein the second support is connected to the second diaphragm layer so as to form the second projection while the second support frame is connected to the second diaphragm layer so as to form the second periphery and the second recess.

5. The pressure sensor element according to claim 4, wherein the first and second beams include a member extending in a direction orthogonal to the longitudinal direction.

6. A pressure sensor, comprising:
the pressure sensor element according to claim 1;
a substrate on which the pressure sensor element is mounted;
a bump provided on the substrate at a position at which the pressure sensor element makes contact with the substrate so as to form a space between the pressure sensor element and the substrate; and
a driving circuit electrically connected to the pressure sensor element so as to drive the pressure sensor element.

7. A pressure sensor, comprising:
the pressure sensor element according to claim 1;
a substrate on which the pressure sensor element is mounted; and
a driving circuit electrically connected to the pressure sensor element so as to drive the pressure sensor element, wherein one of side surfaces of the pressure sensor element is bonded to the substrate.

8. The pressure sensor according to claim 6, wherein the driving circuit is electrically connected to the pressure sensor element by wire bonding.

9. The pressure sensor according to claim 7, wherein the driving circuit is electrically connected to the pressure sensor element through a bump.

* * * * *